(No Model.)

P. J. FRANSZE.
SPLICING TRACTION CABLES.

No. 372,792. Patented Nov. 8, 1887.

Witnesses.
W. Rossiter
Otto Lubkert

Inventor:
Petter J. Fransze
By Wm C Lotz
Atty.

UNITED STATES PATENT OFFICE.

PETTER J. FRANSZE, OF CHICAGO, ILLINOIS.

SPLICING TRACTION-CABLES.

SPECIFICATION forming part of Letters Patent No. 372,792, dated November 8, 1887.

Application filed March 28, 1887. Serial No. 232,698. (No model.)

*To all whom it may concern:*

Be it known that I, PETTER J. FRANSZE, a citizen of the United States of America, residing at Chicago, in the county of Cook and State of Illinois, have invented certain new and useful Improvements in Splicing Traction-Cables, of which the following is a specification, reference being had therein to the accompanying drawings.

This invention has for its object to provide a device for quickly splicing a cable whenever it breaks; and it consists in the device for splicing the cable by forming screw-threads on the ends thereof, to be connected by a screw-threaded sleeve-coupling, all as will be more fully hereinafter described, and specifically claimed.

Figure 3:
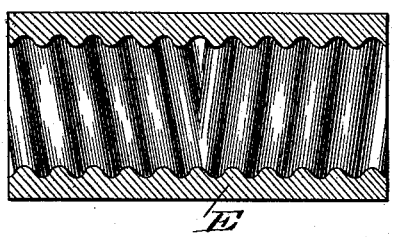
Figure 2:
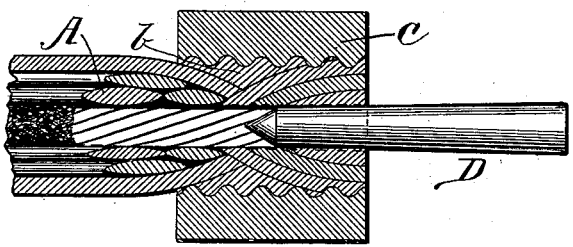
Figure 1:
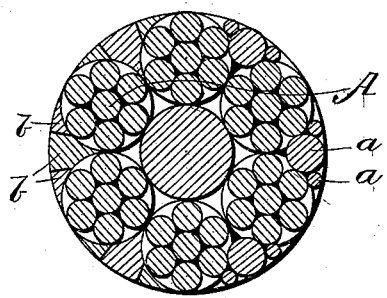
Figure 4:
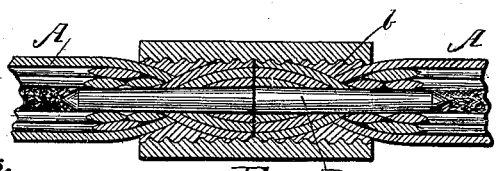

In the accompanying drawings, Figure 1 represents a cross-section of the cable, showing the manner of filling up the spiral grooves between the strands with common or specially-made wires. Fig. 2 shows the manner of forming a screw-thread to the end of a cable. Fig. 3 is a longitudinal section of the cable-splicing sleeve or coupling, and Fig. 4 a section of the spliced portion of the cable.

Corresponding letters in the several figures of the drawings designate like parts.

For splicing two ends of the cable after being made cylindrical by inlaid wires $a$ or $b$, I first remove part of the hemp core, and then, after heating the end of the cable, I insert it into a steel nut or die, having a female screw-thread, rounded to obviate sharp corners, and then I drive into the opening formerly occupied by the core a conical pin, D, that will expand the cable end inside of die C, and will swage thereon a screw-thread. After a screw-thread has been thus formed into the cable end the nut or die C is removed by unscrewing. Upon the opposing ends of the cable to be spliced are thus formed right and left screw-threads, which will engage simultaneously the right and left screw-threads of a sleeve, E, coupling and drawing together the two ends by turning the sleeve E in one direction in the manner of a turn-buckle. The conical pins D will remain in the cable, and with their head ends will butt against each other, thus preventing their working out.

What I claim is—

The manner of splicing a traction-cable, substantially as herein described, the same consisting in forming right and left screw-threads upon the opposing ends of such cables, in the manner set forth, and in connecting the same by a screw sleeve or collar.

In testimony whereof I affix my signature in presence of two witnesses.

PETTER J. FRANSZE.

Witnesses:
WILLIAM H. LOTZ,
OTTO LUBKERT.